United States Patent
Diamant et al.

(10) Patent No.: US 11,562,095 B2
(45) Date of Patent: Jan. 24, 2023

(54) REINFORCING SQL TRANSACTIONS DYNAMICALLY TO PREVENT INJECTION ATTACKS

(71) Applicant: International Business Machines Corporation, Armonk, NY (US)

(72) Inventors: Galia Diamant, Lexington, MA (US); Leonid Rodniansky, Allston, MA (US); Cheng-Ta Lee, Taipei (TW); Chun-Shuo Lin, Tainan (TW); Richard Ory Jerrell, Manchester, NH (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 17/160,775

(22) Filed: Jan. 28, 2021

(65) Prior Publication Data
US 2022/0237314 A1 Jul. 28, 2022

(51) Int. Cl.
*G06F 21/62* (2013.01)
*G06F 21/56* (2013.01)
*G06F 21/55* (2013.01)
*G06F 21/60* (2013.01)

(52) U.S. Cl.
CPC ........ *G06F 21/6227* (2013.01); *G06F 21/554* (2013.01); *G06F 21/566* (2013.01); *G06F 21/602* (2013.01)

(58) Field of Classification Search
CPC .. G06F 21/6227; G06F 21/554; G06F 21/566; G06F 21/602
See application file for complete search history.

(56) References Cited

U.S. PATENT DOCUMENTS

| 9,384,236 B2 | 7/2016 | Wong |
| 10,447,730 B2 | 10/2019 | Gupta |
| 2011/0238683 A1 | 9/2011 | Kim et al. |

(Continued)

FOREIGN PATENT DOCUMENTS

| CN | 101448007 B | 11/2012 |
| CN | 102567546 B | 3/2014 |

(Continued)

*Primary Examiner* — Ayoub Alata
(74) *Attorney, Agent, or Firm* — Anthony Pallone; David H. Judson (57) ABSTRACT

A database protection system (DPS) mitigates injection attacks. DPS receives an unrestricted database query, extract a syntax tree, and evaluates whether it recognizes the query. To this end, DPS applies a hash function over the extracted syntax tree, and then determines whether the resulting hash has been seen by DPS before. If so, DPS retrieves a previously-generated prepared statement associated with the syntax tree, and that prepared statement is then forward to the database server in lieu of sending the original query. If the syntax tree is not recognized, DPS creates a new prepared statement, generates a hash of the syntax tree, and stores the hash and the new prepared statement, and forwards the new prepared statement. The prepared statements are configured based on the native wire protocol used by the database server, and DPS includes additional functionality by which it can learn the semantics of this protocol if necessary.

21 Claims, 7 Drawing Sheets

(56) References Cited

U.S. PATENT DOCUMENTS

| | | | |
|---|---|---|---|
| 2016/0036841 A1* | 2/2016 | Rodniansky | G06F 21/64 |
| | | | 713/187 |
| 2017/0206245 A1 | 7/2017 | Zhang et al. | |
| 2020/0097587 A1 | 3/2020 | Klein | |
| 2020/0201860 A1* | 6/2020 | Vogelsgesang | G06F 16/24539 |
| 2020/0374337 A1* | 11/2020 | Soldano | H04L 67/1097 |

FOREIGN PATENT DOCUMENTS

| | | |
|---|---|---|
| CN | 103744802 B | 5/2017 |
| CN | 105046150 B | 10/2017 |
| CN | 106355094 B | 2/2019 |
| CN | 109657472 A | 4/2019 |

\* cited by examiner

**SQL> select * from sq_test2 where BIRTHDAY = '02-27-1973 00:00:00';** ⟵ 1000

```
00000110 : 00 00 00 00 00 00 00 00 00 00 00 00 00 3d 73 65   .............=se
00000120 : 6c 65 63 74 20 2a 20 66 72 6f 6d 20 73 67 5f 74   lect * from sg_t
00000130 : 65 73 74 32 20 77 68 65 72 65 20 42 49 52 54 48   est2 where BIRTH
00000140 : 44 41 59 20 3d 20 27 30 32 2d 32 37 2d 31 39 37   DAY = '02-27-197
00000150 : 33 20 30 30 3a 30 30 3a 30 30 27 01 00 00 00 00   3 00:00:00'.....
00000160 : 00 00 00 00 00 00 00 00 00 00 00 00 00 00 00 00   ................
00000170 : 00 00 00 00 00 00 00 00 00 00 00 00 00 00 00 00   ................
00000180 : 80 00 00 00 00 00 00 00 00 00 00 00 00 00 00      ...............
```
⟩ 1002 which returns the following record:

| ID | NAME | BIRTHDAY |
|----|------|----------|
| 1  | John | 02-27-1973 00:00:00 |

**SQL> select * from sq_test2 where BIRTHDAY = '02-27-1973 0' or 1=1;** ⟵ 1100

```
00000110 : 00 00 00 00 00 00 00 00 00 00 00 00 00 3d 73 65   .............=se
00000120 : 6c 65 63 74 20 2a 20 66 72 6f 6d 20 73 67 5f 74   lect * from sg_t
00000130 : 65 73 74 32 20 77 68 65 72 65 20 42 49 52 54 48   est2 where BIRTH
00000140 : 44 41 59 20 3d 20 27 30 32 2d 32 37 2d 31 39 37   DAY = '02-27-197
00000150 : 33 20 30 27 20 6f 72 20 31 3d 31 01 00 00 00 00   3 0' or 1=1.....
00000160 : 00 00 00 00 00 00 00 00 00 00 00 00 00 00 00 00   ................
00000170 : 00 00 00 00 00 00 00 00 00 00 00 00 00 00 00 00   ................
00000180 : 80 00 00 00 00 00 00 00 00 00 00 00 00 00 00      ...............
```
⟩ 1102

Which returns the following records, note the second one does not match the original query

| ID | NAME | BIRTHDAY |
|----|------|----------|
| 1  | John | 02-27-1973 00:00:00 |
| 2  | Ivan | 03-12-2003 00:00:00 |

Changing the statement to the following prepared statement

```
00000030 : 00 01 00 00 00 00 00 00 00 00 73 65 6c 65 63 74   .......... select
00000040 : 20 69 64 2c 20 6e 61 6d 65 2c 20 62 69 72 74 68    id, name, birth
00000050 : 64 61 79 20 66 72 6f 6d 20 73 67 5f 74 65 73 74   day from sg_test
00000060 : 32 20 77 68 65 72 65 20 62 69 72 74 68 64 61 79   2 where birthday
00000070 : 20 3d 20 3a 31 20 01 01 00 00 00 00 00 00 01 01    = :1..........
00000080 : 00 02 80 00 00 00 00 01 03 00 00 01 4c 00 01 10   ............L...
00000090 : 00 00 02 03 69 01 00 07 13 30 32 2d 32 37 2d 31   ....i....02-27-1
000000a0 : 39 37 33 20 30 30 3a 30 30 3a 30 30               973 00:00:00
```
} 1200

Which will return the following:

| ID NAME | BIRTHDAY |
|---|---|
| 1 John | 02-27-1973 00:00:00 |

} 1202

And an attempt to modify the packet in place results in a returned error

ORA-00920: invalid relational operator ⟶ 1204

FIG. 12

REINFORCING SQL TRANSACTIONS DYNAMICALLY TO PREVENT INJECTION ATTACKS

BACKGROUND OF THE INVENTION

Technical Field

This disclosure relates generally to securing resources in a distributed computing environment and, in particular, to database access security.

Background of the Related Art

Modern information processing environments typically use an application-server model instead of a traditional client-server model. The application server-based architecture allows each application to perform specific and/or specialized portions of processing before handing a transaction or data stream off to a successive processing tier. An application-server model may utilize a multi-tier arrangement or architecture. In a multi-tier arrangement, each tier is responsible for performing a particular aspect of processing, e.g., database or application tiers can process different data. Different tiers communicate by passing or transmitting data, often according to a predetermined protocol or data structure. A business transaction is therefore passed between tiers, which may be successive layers or nodes in the processing stream. Accordingly, each tier "layer" receives a transaction from a preceding layer.

A multi-tier architecture of this type may include or be associated with a database protection solution/system (DPS). Systems of this type analyze database access by a client application, typically by monitoring a network or local access to the database server, thereby enabling monitoring of transactions to identify suspicious behavior. In a typical solution, an agent (which may be a proxy, or other monitoring functionality) operates to monitor both requests (to the server) and responses (from the server). The requests and responses are forwarded to a security mechanism, which typically includes various components, such as a protocol analyzer module, a statements/commands parser, a policy validation module, and an alert module. The security mechanism is configured to examine the requests and the responses. In particular, a database query that is sent by the database client application to the database server is extracted from the database protocol packets intercepted by the agent; the security mechanism then parses this query up to a database object level, validates the query against one or more security policies for a potential database object access violation, and issues an appropriate alert if an access violation is detected. The system may also suspend database client connection(s) when a security anomaly or violation is detected. A commercial product that provides this type of database access control system functionality is IBM® Guardium®.

Structured Query Language (SQL) injection is a modification of SQL statements that allow malicious users to execute additional queries outside the scope of the database's intended use, thereby allowing the malicious user to execute code, escalate privileges, or retrieve restricted data. A primary method of achieving that malicious goal is by distorting a parameter to embed unexpected commands such that it becomes more than just a parameter itself. A typical way to start an SQL injection attack is to inject the malicious payload at user input, e.g., the input field used to enter a username on a website.

There are many solutions and best practices to prevent SQL injection. One recommendation is that developers use prepared SQL statements instead of string concatenation to construct SQL queries. This best practice, however, is hard to enforce. Also, there are known DPS-based technical solutions (e.g., SQL firewall) that identify and alert on new syntax tree structure in the SQL queries so that administrators can detect anomalies. While these approaches provide benefits, there is a common problem in these existing solutions that detect injection attacks. In particular, if the parser recognizing embedded command contains vulnerabilities or otherwise misses some edge cases, the attack is not recognized. For example, if the query parser in the SQL firewall cannot catch the hidden command to construct a new syntax tree, it will forward the queries containing injection attacks. Other possible solutions, such as running deep analysis on every SQL query captured in an environment, are not scalable, especially when running DPS at the edge.

Thus, there remains a need to provide improved DPS-based techniques that mitigate injection attacks.

BRIEF SUMMARY

A database protection system (DPS) is augmented to provide additional functionality to mitigate injection attacks. To this end, DPS is configured to receive an unrestricted database query. After determining the logical meaning of the query and, in particular, by extracting a syntax tree, DPS evaluates whether it recognizes the query. This evaluation is made by DPS applying a hash function over the extracted syntax tree, and then determining whether the resulting hash has been seen by DPS before. If, as a result of the hash evaluation (e.g., a lookup into a hash table), the syntax tree is recognized as being associated with a prior database query, DPS retrieves a previously-generated prepared statement associated with the syntax tree. The previously-generated prepared statement is executed, i.e., forwarded to the database server. The unrestricted database query, however, is not forwarded to the database server. If, however, the syntax tree is not recognized as being associated with any prior database query, DPS creates a new prepared statement, generates a hash of the syntax tree, and stores the hash and the new prepared statement for subsequent use. Once again, and in lieu of forwarding the original unrestricted database query, the newly-created prepared statement is executed. Thus, preferably DPS only forwards prepared statements to the database server. These statements are configured as necessary based on the native wire protocol used by the database server, and DPS includes additional functionality by which it can learn the semantics of this protocol if necessary.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which:

FIG. 10 depicts a representative SQL query, its associated database protocol packet, and a response returned from the database server;

FIG. 11 depicts how the query and database protocol packet in FIG. 10 are modified to create an injection attack.

DETAILED DESCRIPTION OF AN ILLUSTRATIVE EMBODIMENT

Figure 1:
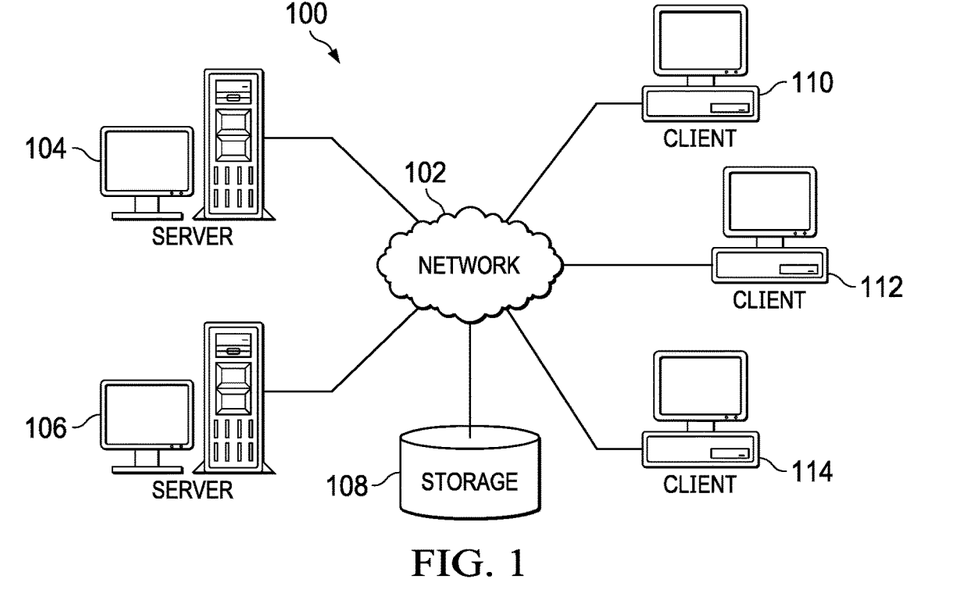
FIG. 1 depicts an exemplary block diagram of a distributed data processing environment in which exemplary aspects of the illustrative embodiments may be implemented.
Figure 2:
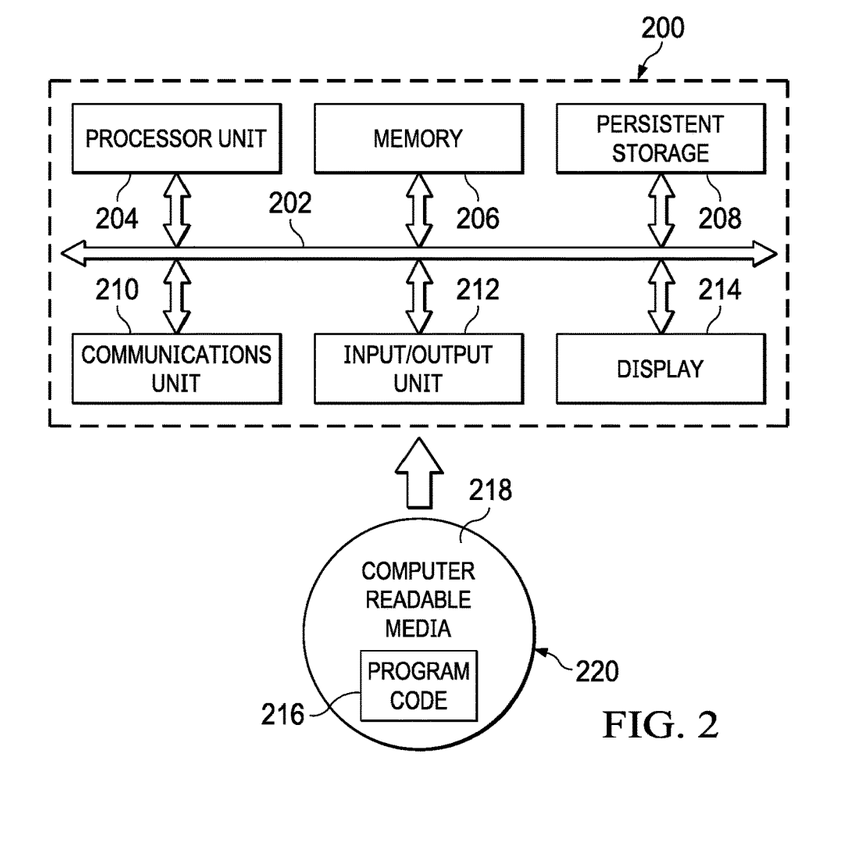
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Monitored Server Security Systems

Figure 3:
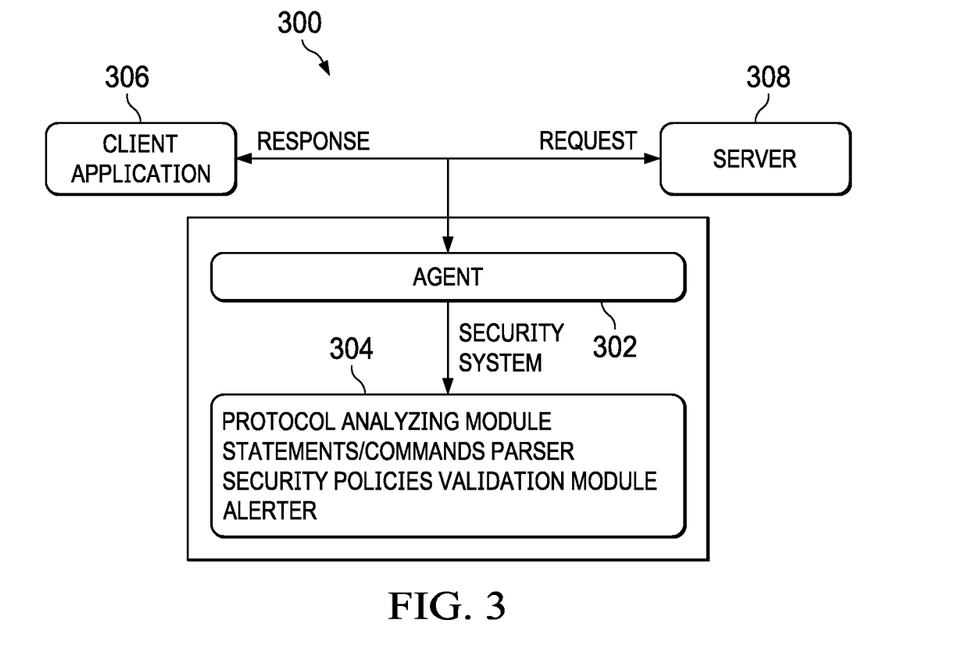
FIG. 3 depicts a generalization of a security system for monitoring a server in a client-server operating environment.

As described above, it is known to protect servers using intrusion detection. Security systems of this type typically analyze server access attempts by monitoring a network or local access to the server. FIG. 3 depicts a general solution of this type. As depicted, in this system 300 a client application 306 interacts with a server 308, and an agent 302 (which may be a proxy, or other monitoring functionality) operates to monitor both requests (to the server) and responses (from the server). The requests and responses are forwarded to a security mechanism 304. The security mechanism 304 typically includes various components, namely, a protocol analyzer module, a statements/commands (or "statement/command") parser, a policy validation module, and an alert module. Generally, the security mechanism is configured to examine the requests and the responses.

In particular, the agent 302 is configured to examine the application protocol request or response. Such a request/response is represented in the form of application protocol structure. Different types of clients/servers use different application protocol and statements/commands languages, although typically the request and response flow is common. Typically, a request contains application protocol metadata. The protocol analyzing module extracts a statement/command from the request. To this end, the protocol analyzing module needs to be aware of the applicable application protocol structures. Statements/commands extracted by the protocol analyzing module are then passed to the statement/command parser for evaluation. The statement/command parser may successfully parse the statement/command extracted by the protocol analyzing module, in which case the statement is then evaluated against one or more security policies. As also previously described, in certain situations, however, the statement/command parser cannot successfully parse the statement/command extracted by the protocol analyzing module. This operating scenario is addressed by the technique of this disclosure, as will be described below.

Figure 4:
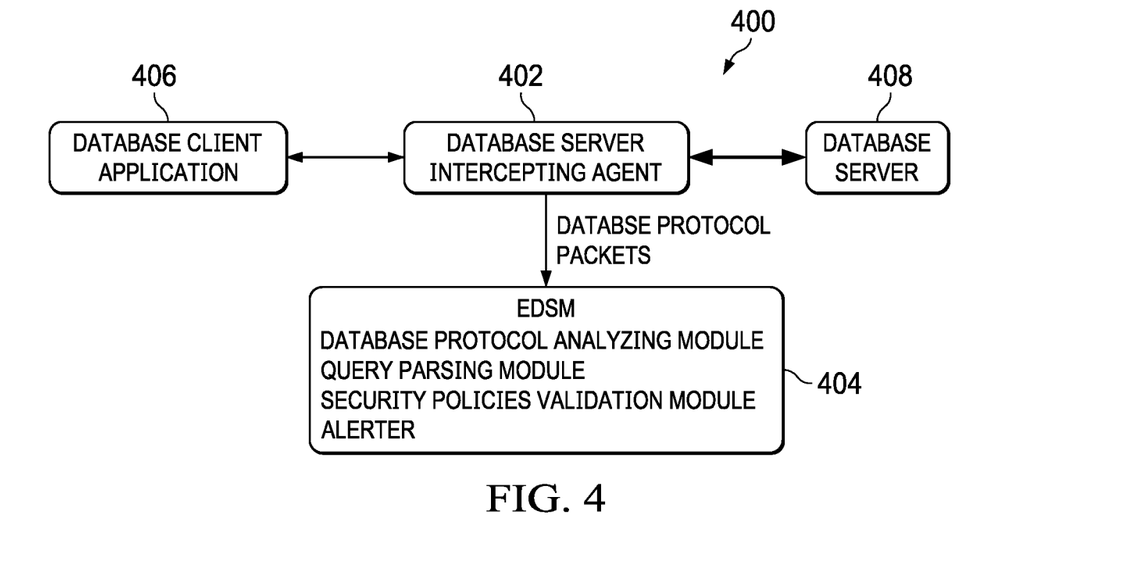
FIG. 4 depicts an access control system (e.g., for a database) that is structured with a security mechanism in accordance with the technique shown in FIG. 3.

By way of additional background, FIG. 4 depicts the basic operation of a database access control system 400 that comprises a database server intercepting agent 402 and an associated database security mechanism, e.g., an external-to-database security mechanism (EDSM) 404. As a skilled person will appreciate, the access control system in FIG. 4 is a special case of the generalized security system architecture depicted in FIG. 3. As depicted in FIG. 4, in this embodiment the agent 402 is situated in-line between a database client application 406, and a database server 408. Queries initiated to the database server 408 by the database client application 406 are intercepted by agent 402, and database protocol packets comprising those queries are forwarded to the EDSM 410 for evaluation. In this embodiment, the intercepting agent 402 typically also monitors the responses received from the database server 408. Typically, a database protocol packet refers to a formatted unit of data used in communication between the database client application and the database server. As is known, EDSM 410 typically includes several modules, e.g., a database protocol analyzing module, a query parsing module, a security policy validation module, and an alerting module. These modules typically are implemented as software executing in hardware. One core function of the EDSM is to extract the database query that is sent by the database client application 406 to the database server 408 and intercepted by the agent 402, parse this query up to a database object level, validate it (for potential database object access violations) against one of more EDSM security policies. If an access violation is detected, the EDSM issues an alert to this effect, or takes some other notification, mitigation or remediation function.

Figure 5:
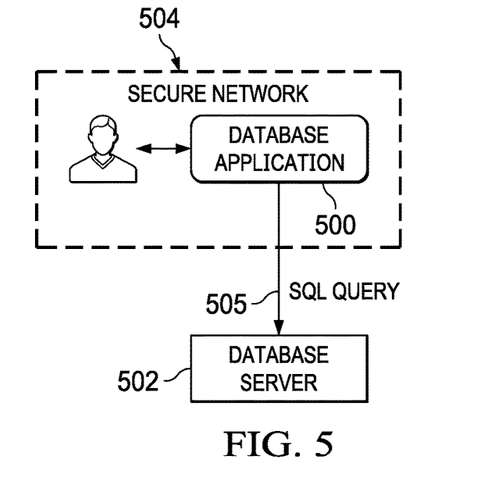
FIG. 5 depicts an SQL query between a database client and a database server wherein the SQL query can be modified to create a security vulnerability.
Figure 6:
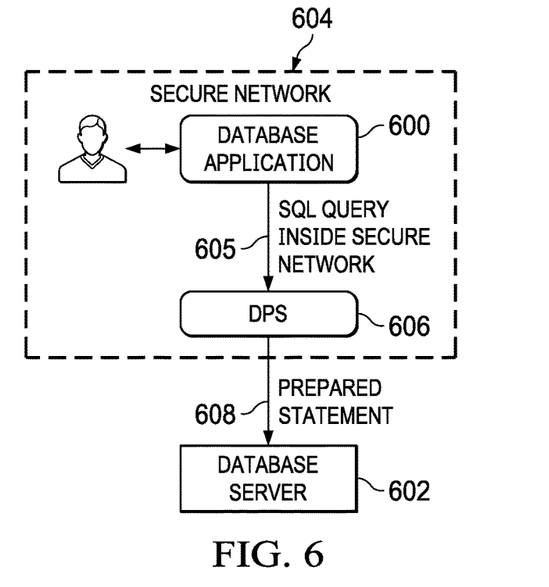
FIG. 6 depicts the SQL query between the database client and a database server according to the technique of this disclosure wherein a DPS is configured to dynamically prevent SQL injection attack.

FIG. 5 depicts a representative SQL operation between a database client application 500 and a database server 502, where the database application resides in a secure network 504. This example scenario illustrates how the SQL statement 505 can be modified when it leaves the secure network 504. FIG. 6 depicts the solution of this disclosure, and in this example embodiment the secure network 604 includes the database client application 600 and the DPS 606. Here, the SQL query 605 is made inside the secure network 604, and the DPS 606 is configured to create the prepared statement 608 before the query exits the secure network 604. In this embodiment, and according to this disclosure, the SQL query between the database client 600 and the database server 602 cannot be modified outside of the secure zone provided by the secure network 604. In particular, an attempt to modify the query (by an external actor) will not be successful as it leaves the secure network as a prepared statement.

Reinforcing SQL Transactions Dynamically to Prevent Injection Attacks

With the above as background, the techniques of this disclosure are now described. As FIG. 6 depicts, the approach herein involves DPS intercepting an SQL query and transforming it dynamically to prevent injection attacks. In particular, and because DPS is implement as a man-in-the-middle (MITM) proxy that is installed between the applications, and the database servers, it can transform the SQLs on-the-fly. As will be described, the transformation itself is straightforward but, depending on implementation, DPS may be required to be familiar with many database wire protocols and be able to parse, transform and inject packets. The solution of this disclosure provides an effective and robust solution, irrespective of the implementation.

To this end, preferably DPS intercepts a database protocol packet that includes an SQL query (more generally, an unrestricted SQL command) intended for the database server, parses the statement to understand its logical meaning, and then implements the logical meaning of the SQL statement as a so-called "prepared statement." The logical meaning typically is encoded as a syntax tree (or syntax tree "structure"). As used herein, a "prepared statement" has its art-intended definition. In particular, in database management systems (DBMS), a prepared statement (sometimes referred to as a parameterized statement) is a feature used to execute the same or similar database statements repeatedly with high efficiently. Typically, the mechanism is used with SQL statements such as queries or updates. In practice, and as will be described below, DPS is configured to include a prepared statement mechanism that receives an unrestricted database query command, creates the prepared statement, and that then substitutes the prepared statement for the SQL statement that DPS intercepts. As will be described, preferably this DPS prepared statement mechanism includes special logic to determine whether or not DPS has previously generated the necessary prepared statement (corresponding to the unrestricted database query command), and thus this logic ensures that the DPS only executes its prepared statement generation logic as needed.

The prepared statement takes the form of a template into which certain constant values are substitute during each execution. A typical prepared statement workflow comprises three (3) operations: prepare, compile and execute. The prepare operation involves the application creating or otherwise obtaining the statement template, with certain values (the parameters, placeholders or bind variables) left unspecified. The template identifies the positioning of these values with a statement or query with question marks (e.g., INSERT INTO table (attribute$_1$,attribute$_2$) VALUES (?,?). The compile operation parses, optimizes and translates the statement template into the appropriate form for the on-the-wire protocol, and then stores the result. At a later time, and as will be described, DPS supplies (or binds) values for the parameters of the statement template, and it then sends the resulting prepared statement (with associated bound values) to the database server.

The above-described SQL transformation capability enforces the security of (DPS) monitored database connections by converting unrestricted SQL input to prepared statements, thereby further improving security by resisting SQL injection. Converting SQL queries to prepared statements according to this disclosure also mitigates the future vulnerabilities (zero day) in query parsers. This provides a significant enhancement to the existing database security benefits of the DPS.

Figure 7:
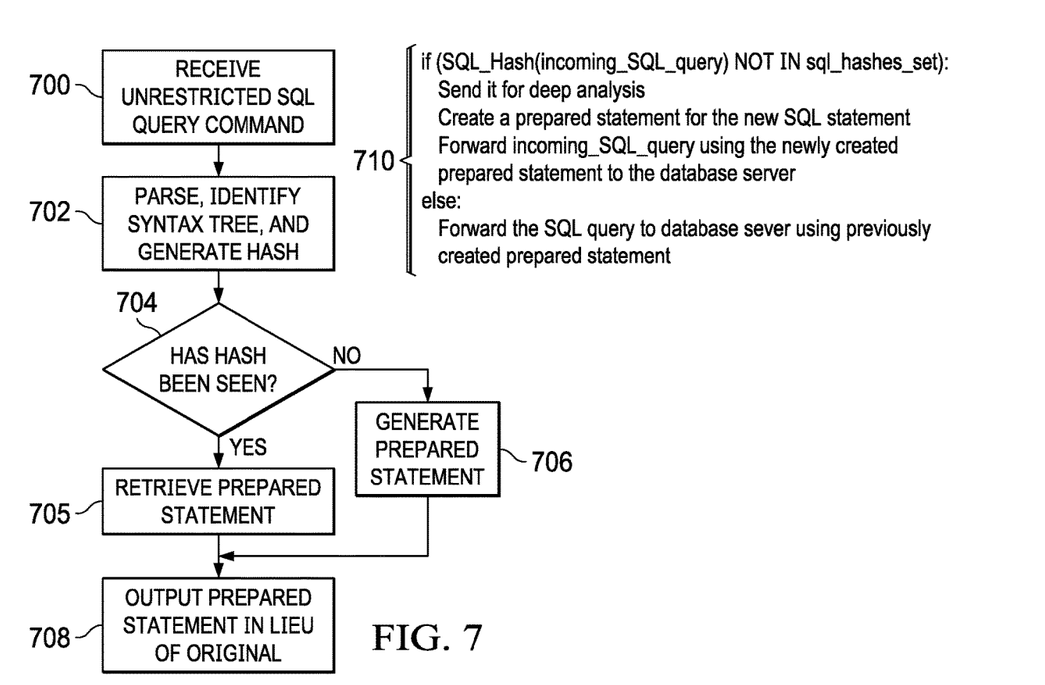
FIG. 7 depicts a process flow of a preferred technique of this disclosure.

There is overhead associated with generating the prepared statement and, as noted above, the DPS further includes logic to ensure operational efficiency. This aspect of the disclosure is now described. Preferably, the logic is hash-based in the sense that the logic maintains a hash table including a hash corresponding to a syntax tree represented by an SQL statement. A hash of a particular syntax tree typically is generated by processing the syntax tree, and then executing a hash function (e.g., MD5, SHA-1, or the like) over the result. The hash function may be a cryptographic hash function, but this is not a requirement, as a simple checksum, or some other encoding, may be used. Once DPS processes a syntax tree into a hash and stores the hash in the hash table, a simple lookup into the hash table can be used later to determine whether DPS needs to generate a new prepared statement (or, instead, whether it already has a prepared statement available for use). The hash table thus comprises a set of prepared statements, with each prepared statement indexed by its unique hash. To this end, and with reference to the process flow in FIG. 7, upon receipt (intercept) of an unrestricted SQL query command at step 700, DPS parses the command, identifies the syntax tree, and generates the hash of that syntax tree at step 702. At step 704, a test is performed to determine whether the generated hash is present in the hash table (called sql_hashes_set). If the outcome of the test at step 704 is negative, meaning that the syntax tree has not been seen previously, DPS needs to create a prepared statement. At step 706, the prepared statement is generated (either by DPS directly or indirectly using other components). This new prepared statement is then used at step 708 in lieu of the unrestricted SQL command originally received. If the outcome of the test at step 704 is positive, however, a prepared statement already exists; DPS retrieves it from the hash table (or other data store) and control returns to step 708. The previously-created prepared statement (associated to the recognized hash) is then forwarded to the database server. This completes the processing. FIG. 7 also depicts representative pseudo-code 710 that may be used to implement the processing shown in FIG. 7.

In a representative embodiment, the function SQL_Hash( ) in the pseudo-code 710 is a function containing a parser that extracts the syntax tree structure from a query to create a hash value. If two SQL queries have the same syntax tree structure, the function SQL_Hash( ) computes the same hash value for them. The pseudo-code 710 ensures that every query leaving DPS (in a preferred embodiment) is in a prepared SQL statement.

Generalizing, and according to this disclosure, DPS is augmented to perform several additional functions. It includes one or more additional components (or original components augmented to include the functions). One such function analyzes an incoming SQL statement to decide whether in-line transformation (to convert it to a prepared SQL statement) is necessary, e.g., based on a policy, by default, or based on some configuration. In the embodiment described above, the DPS executes its SQL_Hash( ) function, which as noted above determines whether an existing prepared statement already exists for a received SQL statement. Depending on the outcome of the analysis, another function transforms the SQL statement to a prepared SQL statement. Finally, an additional function than replaces the original payload of the statement with a new payload, and then outputs the result (to the database server). These functions may be separate, or they may be integrated with one another. Also, one or more of the functions may leverage existing DPS operational capability.

Figure 8:
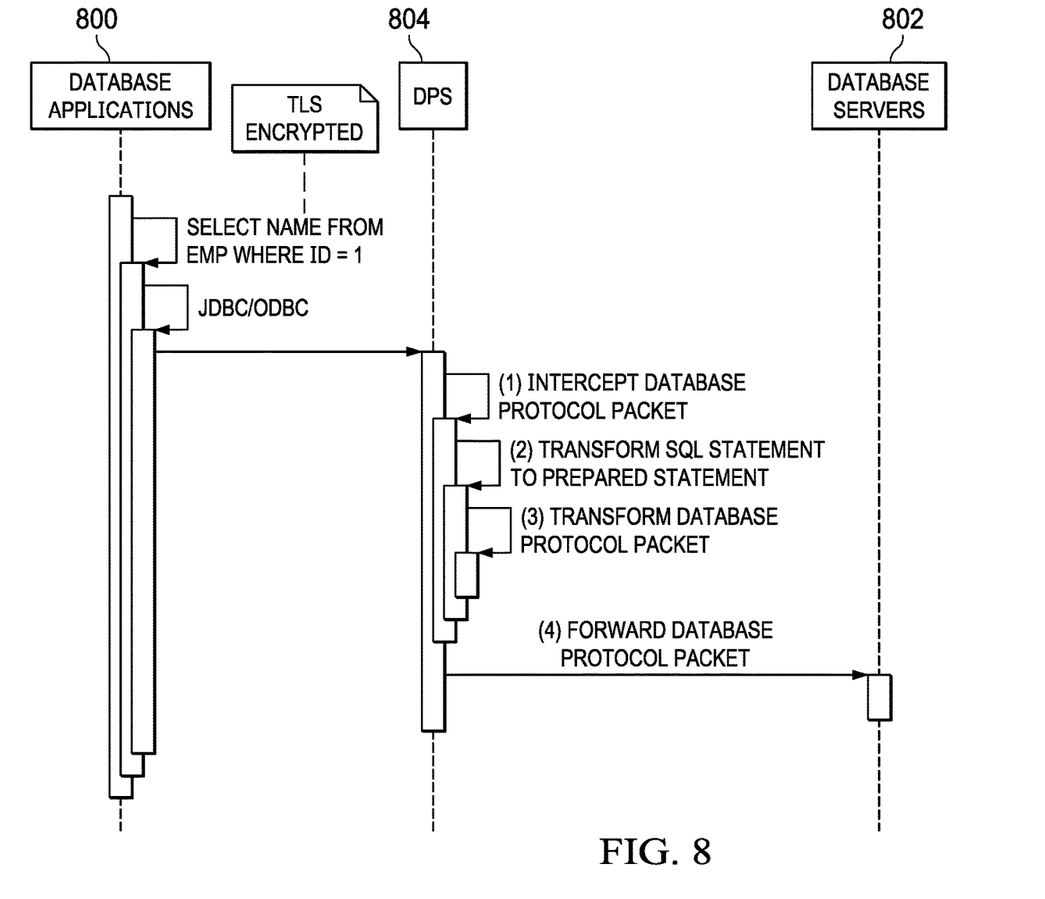
FIG. 8 depicts a first operating scenario wherein DPS has knowledge of the native wire protocol used by the database protection system and the database server.
Figure 9:
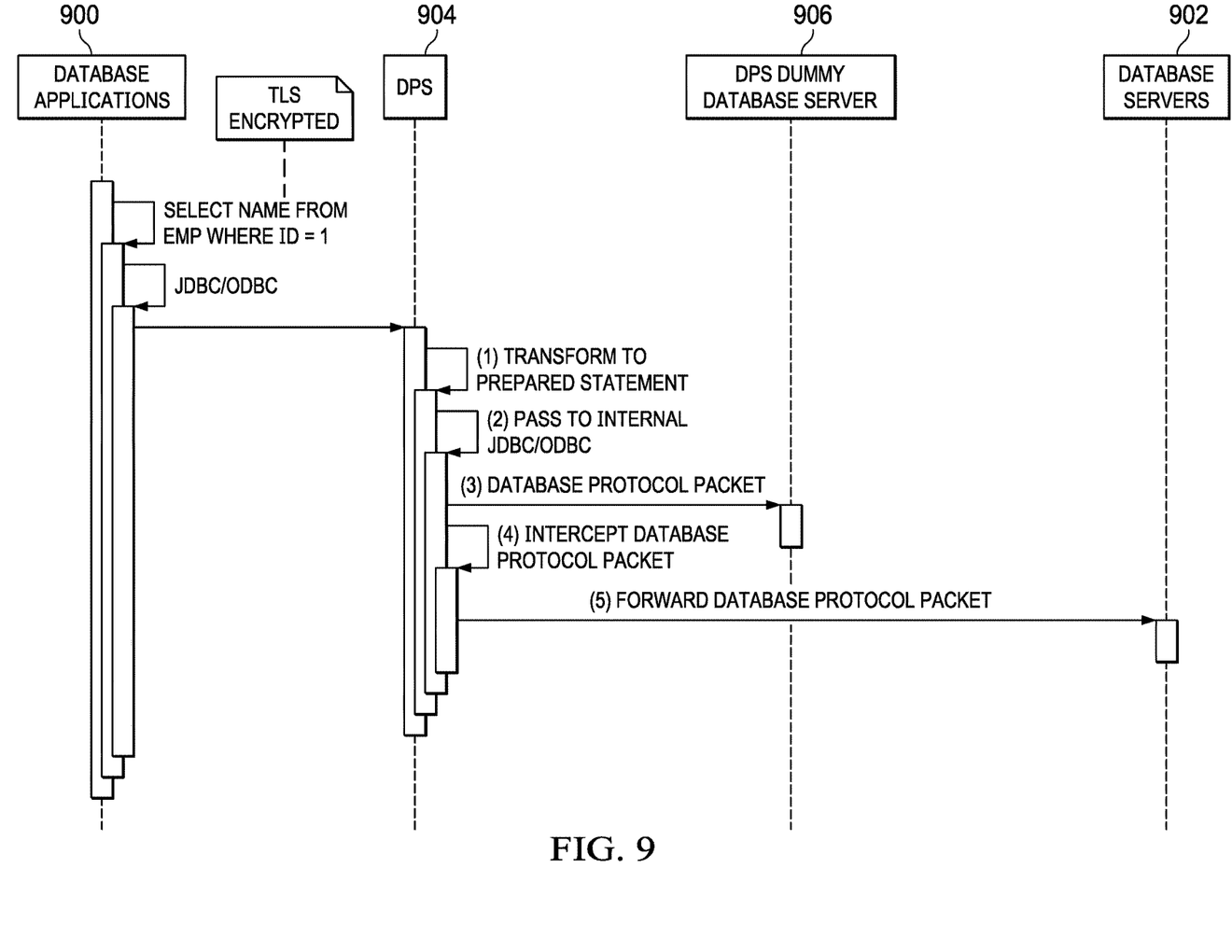
FIG. 9 depicts a second operating scenario wherein DPS has limited knowledge of the native wire protocol used by the database protection system and the database server.

In the above-described operation, DPS implements the logical meaning of the original SQL statement as a prepared statement in the native wire protocol, and appends the bound variables per any requirements of the wire protocol. FIGS. 8 and 9 depicts this operation in one of two variant scenarios: (1) where DPS has full knowledge of the wire protocol (FIG. 8), and (2) where DPS has minimal knowledge of the wire protocol (FIG. 9). These use cases are now described. With reference to FIG. 8, it is assumed that database client application 800 has a TLS-encrypted connection to the DPS 804, which is located intermediate the client application 800 and the database server 802. In this example scenario, the user of the client application has formulated an SQL query (SELECT NAME FROM EMP WHERE ID=1). Using its associated JDBC/ODBC drivers, the application creates a connection and outputs the query via TLS in the usual manner. Because DPS 804 is present, the query is received at (e.g., intercepted by) the DPS 804, as step (1). Using the above-described syntax tree analysis and in-line transformation functionality (functionality), DPS parses the SQL statement (in the database protocol packet) to understand its logical meaning (the syntax tree structure), and then (at step (2)) implements the logical meaning of the SQL statement as a prepared statement and in the native wire protocol. At step (3), the DPS transform the database protocol packet, preferably by appending one or more bound variables (the variables that were present in the original SQL statement), per the requirements of the wire protocol. At step (4), DPS 804 submits the prepared statement and bound variables to the back-end service, namely, the database server 802. This completes the processing for the intercepted SQL query.

FIG. 9 depicts a variant use case where the DPS 904 has only minimal knowledge of the wire protocol. In this example, the database client application 900 once again generates the SQL query, and its local JDBC/ODBC drivers have created the connection. The SQL packet is then output over the wire, where it is intercepted by the DPS 904 at step (1). This is similar to the operation in FIG. 8, and here (once again) it is assumed that DPS has parsed the SQL statement to understand the logical meaning. At this point, DPS is ready to create the prepared statement in the manner previously described. That said, and because DPS only has minimal knowledge of the wire protocol, it cannot perform the transformation until it obtains the information about how to formulate the prepared statement (for this particular wire protocol). In other words, in this embodiment, the DPS must obtain the necessary knowledge (the wire protocol semantics) in some manner. In a preferred approach, DPS does so as follows. At step (2), DPS passes control to its own internal JDBC/ODBC driver, and at step (3), the DPS internal JDBC/ODBC driver creates a secondary connection, preferably to a dummy service 906 configured as a database server. The secondary connection may also be set up to the actual (production) database server 902 that is the target of the SQL query. On this secondary connection, and continuing at step (3), DPS creates a textual prepared procedure (corresponding to what the prepared statement should look like, but in text form) F and submits it (as a database protocol packet) to the internal dummy service or database server. At step (4), DPS captures the wire packet created during this process, and this wire packet is then analyzed by DPS to determine the wire protocol semantics. DPS now has the knowledge it needs to transform the original SQL packet into the prepared statement. Accordingly, and at step (4), DPS then transforms the original database packet into the prepared statement, applies the bound variables, etc. At step (5), DPS sends the database protocol packet to the production database server 904. This completes the processing.

Thus, in the FIG. 9 embodiment, the DPS learns the wire protocol semantics on-the-fly, and this knowledge preferably is cached (by DPS) for re-use. Thus, steps need only be carried out initially (e.g., on a first protocol packet). In addition, because DPS is able to learn the wire protocol semantics from just the outbound connection established by its local JDBC/ODBC driver, the DPS need not analyze (or even receive) anything back from the dummy service (or back-end). Thus, once the DPS captures the JDBC/ODBC driver packet that represents how the binary protocol formulates data on the local wire, it can use the information obtained to formulate the prepared statement. In this manner, the DPS can interoperate with different wire protocols irrespective of their differing semantics and complexities.

Figure 12:
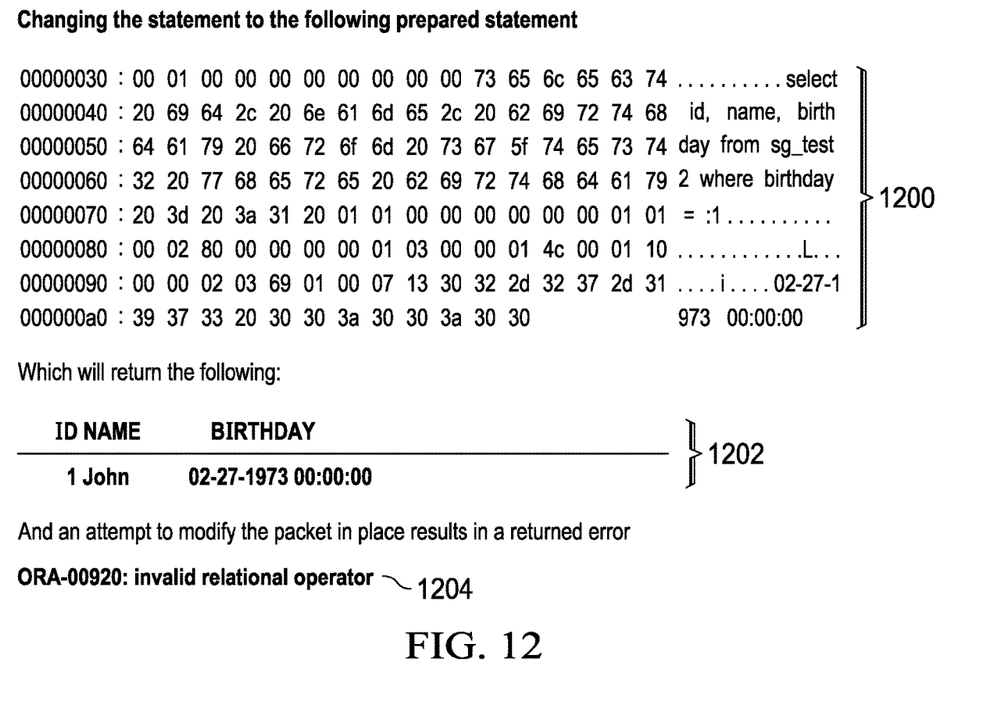
FIG. 12 depicts how the DPS functionality of this disclosure incorporates the prepared statement into the database protocol packet to mitigate the injection attack.

FIGS. 10-12 depicts various SQL statement(s) and their associated on-the-wire database protocol packets. In particular, FIG. 10 depicts an SQL statement 1000, and its associated on-the-wire database protocol packet 1002. When processed by the database server, the database record 904 is returned. This SQL query is vulnerable to attack, and FIG. 11 depicts how a hacker changes the statement, generating the vulnerable SQL statement 1100. FIG. 11 also depicts the vulnerable SQL query database protocol packet 1102, as well as the database records 1104 returned in response to the query. Note that the second record does not match the original query. Now, and with the techniques of this disclosure implemented, DPS performs the in-line transformation previously described and outputs the database protocol packet 1200 having the prepared statement representing the original SQL. In response, the database server returns database record 1202, as this record is the only one that matches the original query. If an attacker seeks to modify the packet 1200 in place, however, the database server returns an error 1204.

While the above-described functionality preferably is implemented in DPS, this is not a requirement, as some or all of the described functionality may be implemented in association with DPS (with other components). Thus, in one example, it may be desired to use another processing capability (e.g., component 304 or 404) external to DPS to perform the actual deep analysis of the SQL command.

The technique described provides significant advantages. As noted, the above-described solution provides a scalable, robust and efficient extension to DPS audit and data access control functionalities, thereby improving the operation of the DPS. To this end, the approach adds a SQL transformation capability to enforce the security of monitored database connections by converting unrestricted SQL input to prepared statements, improving the security by resisting SQL injection. As previously noted, converting SQL queries to prepared statements also mitigates the future vulnerabilities (zero day) in query parsers. This characteristic brings a good technical advance to any existing database security solutions.

More specifically, the approach herein (the in-line transformation from SQL statements to prepared statements) removes literals from the statement. The removal of the literals from the statement prevents them from being processed in a fashion that could lead to them being interpreted as another statement. As this can be used to inject malicious code, this removal results in mitigating the threat. In addition, and using the hash function checking described above, once a statement has been prepared the first time, subsequent uses of the statement do not result in the textual query being sent to the database. In this manner, prepared statements are created only for the new SQL queries DPS never sees before. This removes the opportunity for a downstream MITM attacker to modify the query semantics. Additionally, the DPS includes a mechanism to implement the transformation in a manner that does not necessarily require full knowledge of the on-the-wire protocol used by the database server.

The techniques described reinforce SQL transactions dynamically to prevent injection attacks. For example, assume an edge case wherein a hacker has found a bug in an existing database query parser and decides to use that bug to hide the injected command. First, the hacker must modify an existing SQL query to embed the injection attack, so DPS cannot prevent the attack since it is assumed to have already create a prepared statement for the existing SQL query. Second, because of the bug in the database query parser, the hash function will fail to generate a different hash value for the malicious query so that the query is not subject to deep analysis. However, because of the same hash already present in the hash table, DPS will forward the query using the prepared statement created previously so that all the hidden commands crafted by the attacker do not take effect. In this manner, the technique of this disclosure turns vulnerabilities in the query parser into weapons against hackers.

An example deployment for the technique of disclosure provides for enhanced security for legacy applications running in a cloud environment. Queries going between secure on-premises clients and the cloud are exposed to modification once they leave the secure network.

Generalizing, the enhanced DPS functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud. A representation commercial DPS in which the described technique may be implemented is IBM® Guardium® DPS, but this is not a limitation.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the DPS, or the above-described functional and logic components of this solution, as the case may be, are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the DPS (or other components or systems) described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques disclosed herein are not limited to a multi-component transaction processing environment, but this will be a typical implementation. As noted, the above-described function may be used in any system, device, portal, site, or the like wherein server-set session management data might be re-used (either by an original user in a different session, or by another user) through the same client browser.

The technique described herein is not limited for use with any particular database access protocol, and it may be applied in other database access schemes generally. Thus, while the depicted approach is a preferred operating environment, the approach may be implemented in any database access scheme wherein database client requests are processed for potential security violations in the manner described.

The techniques are not limited for use with Structured Query Language (SQL), but they may be applied irrespective of the query language and syntax.

The techniques herein provide for improvements to another technology or technical field, namely, database access control systems, as well as improvements to the operational capabilities of such systems when used in the manner described.

Having described the subject matter, what we claim is as follows.

The invention claimed is:

1. A method operative in a database protection system wherein database requests directed from a client to a database server are monitored to identify suspicious behavior, comprising:
   receiving an unrestricted database query;
   applying a hash function over a syntax tree extracted from the unrestricted database query to generate a hash;
   determining, based on the hash, whether the syntax tree is recognized as being associated with a prior database query;
   upon determining that the syntax tree is recognized as being associated with a prior database query, retrieving a prepared statement associated with the syntax tree;
   upon determining that the syntax tree is not recognized as being associated with the prior database query, creating a new prepared statement; and
   in lieu of forwarding the unrestricted database query, forwarding to the database server one of: the prepared statement, and the new prepared statement.

2. The method as described in claim 1 wherein the prepared statement or the new prepared statement is implemented in a wire protocol associated with the database server.

3. The method as described in claim 2 further including discovering one or more characteristics of the wire protocol prior to forwarding the prepared statement or the new prepared statement.

4. The method as described in claim 3 wherein the one or more characteristics are discovered by opening a connection from the database protection system, providing an output on the connection, and analyzing a wire packet associated with that output.

5. The method as described in claim 4 wherein the output is provided to one of: a dummy service, and the database server.

6. The method as described in claim 1 wherein the hash function is a cryptographic hash.

7. The method as described in claim 1 where creating a new prepared statement includes generating a hash of the syntax tree not recognized as being associated with the prior database query, and storing the hash and the new prepared statement.

8. Apparatus for use in a database protection system wherein database requests directed from a client to a database server are monitored to identify suspicious behavior, comprising:
   a processor;
   computer memory holding computer program instructions executed by the processor, the computer program instructions comprising program code configured to:
   receive an unrestricted database query;
   apply a hash function over a syntax tree extracted from the unrestricted database query to generate a hash;
   determine, based on the hash, whether the syntax tree is recognized as being associated with a prior database query;
   upon determining that the syntax tree is recognized as being associated with a prior database query, retrieve a prepared statement associated with the syntax tree;
   upon determining that the syntax tree is not recognized as being associated with the prior database query, create a new prepared statement; and
   in lieu of forwarding the unrestricted database query, forward to the database server one of: the prepared statement, and the new prepared statement.

9. The apparatus as described in claim 8 wherein the prepared statement or the new prepared statement is implemented in a wire protocol associated with the database server.

10. The apparatus as described in claim 9 wherein the program code is further configured to discover one or more characteristics of the wire protocol prior to forwarding the prepared statement or the new prepared statement.

11. The apparatus as described in claim 10 wherein the one or more characteristics are discovered by opening a connection from the database protection system, providing an output on the connection, and analyzing a wire packet associated with that output.

12. The apparatus as described in claim 11 wherein the output is provided to one of: a dummy service, and the database server.

13. The apparatus as described in claim 8 wherein the hash function is a cryptographic hash.

14. The apparatus as described in claim 8 wherein the program code configured to create a new prepared statement includes program code configured to generate a hash of the syntax tree not recognized as being associated with the prior database query, and store the hash and the new prepared statement.

15. A computer program product in a non-transitory computer readable medium, the computer program product holding computer program instructions executed by a processor in association with a database protection system wherein database requests directed by a client to a database server are monitored to identify suspicious behavior, the computer program instructions comprising program code configured to:
   receive an unrestricted database query;
   apply a hash function over a syntax tree extracted from the unrestricted database query to generate a hash;
   determine, based on the hash, whether the syntax tree is recognized as being associated with a prior database query;
   upon determining that the syntax tree is recognized as being associated with a prior database query, retrieve a prepared statement associated with the syntax tree;
   upon determining that the syntax tree is not recognized as being associated with the prior database query, create a new prepared statement; and
   in lieu of forwarding the unrestricted database query, forward to the database server one of: the prepared statement, and the new prepared statement.

16. The computer program product as described in claim 15 wherein the prepared statement or the new prepared statement is implemented in a wire protocol associated with the database server.

17. The computer program product as described in claim 16 wherein the program code is further configured to discover one or more characteristics of the wire protocol prior to forwarding the prepared statement or the new prepared statement.

18. The computer program product as described in claim 17 wherein the one or more characteristics are discovered by opening a connection from the database protection system, providing an output on the connection, and analyzing a wire packet associated with that output.

19. The computer program product as described in claim 18 wherein the output is provided to one of: a dummy service, and the database server.

20. The computer program product as described in claim 15 wherein the hash function is a cryptographic hash.

21. The computer program product as described in claim 15 wherein the program code configured to create a new prepared statement includes program code configured to generate a hash of the syntax tree not recognized as being associated with the prior database query, and store the hash and the new prepared statement.

* * * * *